US010899541B2

(12) United States Patent
Luckay et al.

(10) Patent No.: US 10,899,541 B2
(45) Date of Patent: Jan. 26, 2021

(54) METHODS AND SYSTEMS FOR IN-ROUTE ITEM SORTING AND PACKAGING

(71) Applicant: United States Postal Service, Washington, DC (US)

(72) Inventors: Ryan M. Luckay, Vienna, VA (US); Robert E. Dixon, Jr., Haymarket, VA (US); Gregory Cooil, Arlington, VA (US)

(73) Assignee: United States Postal Service, Washington, DC (US)

(*) Notice: Subject to any disclaimer, the term of this patent is extended or adjusted under 35 U.S.C. 154(b) by 0 days.

(21) Appl. No.: 16/409,132

(22) Filed: May 10, 2019

(65) Prior Publication Data

US 2019/0263590 A1 Aug. 29, 2019

Related U.S. Application Data

(63) Continuation of application No. 15/849,316, filed on Dec. 20, 2017, now Pat. No. 10,351,347.

(60) Provisional application No. 62/437,499, filed on Dec. 21, 2016.

(51) Int. Cl.
*B65G 1/137* (2006.01)
*B25J 9/16* (2006.01)
*G06Q 50/32* (2012.01)
*G06Q 10/08* (2012.01)

(52) U.S. Cl.
CPC ............ *B65G 1/137* (2013.01); *B25J 9/1612* (2013.01); *B25J 9/1679* (2013.01); *G06Q 10/083* (2013.01); *G06Q 50/32* (2013.01)

(58) Field of Classification Search
CPC combination set(s) only.
See application file for complete search history.

(56) References Cited

U.S. PATENT DOCUMENTS

| 9,256,852 | B1 | 2/2016 | Myllymaki |
| 9,741,010 | B1 | 8/2017 | Heinla |
| 2014/0266799 | A1* | 9/2014 | Liu ................. G06Q 30/0267 340/928 |
| 2015/0006005 | A1 | 1/2015 | Yu et al. |
| 2015/0153175 | A1 | 6/2015 | Skaaksrud |
| 2015/0321595 | A1 | 11/2015 | Hempsch et al. |
| 2016/0221768 | A1* | 8/2016 | Kadaba ................. B65G 47/02 |

(Continued)

*Primary Examiner* — Kyle O Logan
(74) *Attorney, Agent, or Firm* — Knobbe, Martens, Olson & Bear LLP

(57) ABSTRACT

Methods and systems for in route mail sorting and packaging are disclosed. One aspect disclosed is a vehicle including a freight bay. The freight bay includes a plurality of item storage bins. The freight bay also includes a robot. The robot includes a means for grasping items and moving them between the item storage bins. For example, the robot may include an item manipulating attachment that in some aspects may include two or more extending portions for grasping items. The robot may assemble item packages from a plurality of individual items based on addresses of the items. The robot may also manipulate shrink wrap around the item package and position the item package within a station that heats the package and causes the shrink wrap to shrink around the items in the package, thereby forming the items into a package that is easy to deliver to a single address.

17 Claims, 12 Drawing Sheets

(56) References Cited

U.S. PATENT DOCUMENTS

2017/0140329 A1 5/2017 Bernhardt et al.
2017/0210194 A1* 7/2017 Ling ................. B60H 1/00428

* cited by examiner

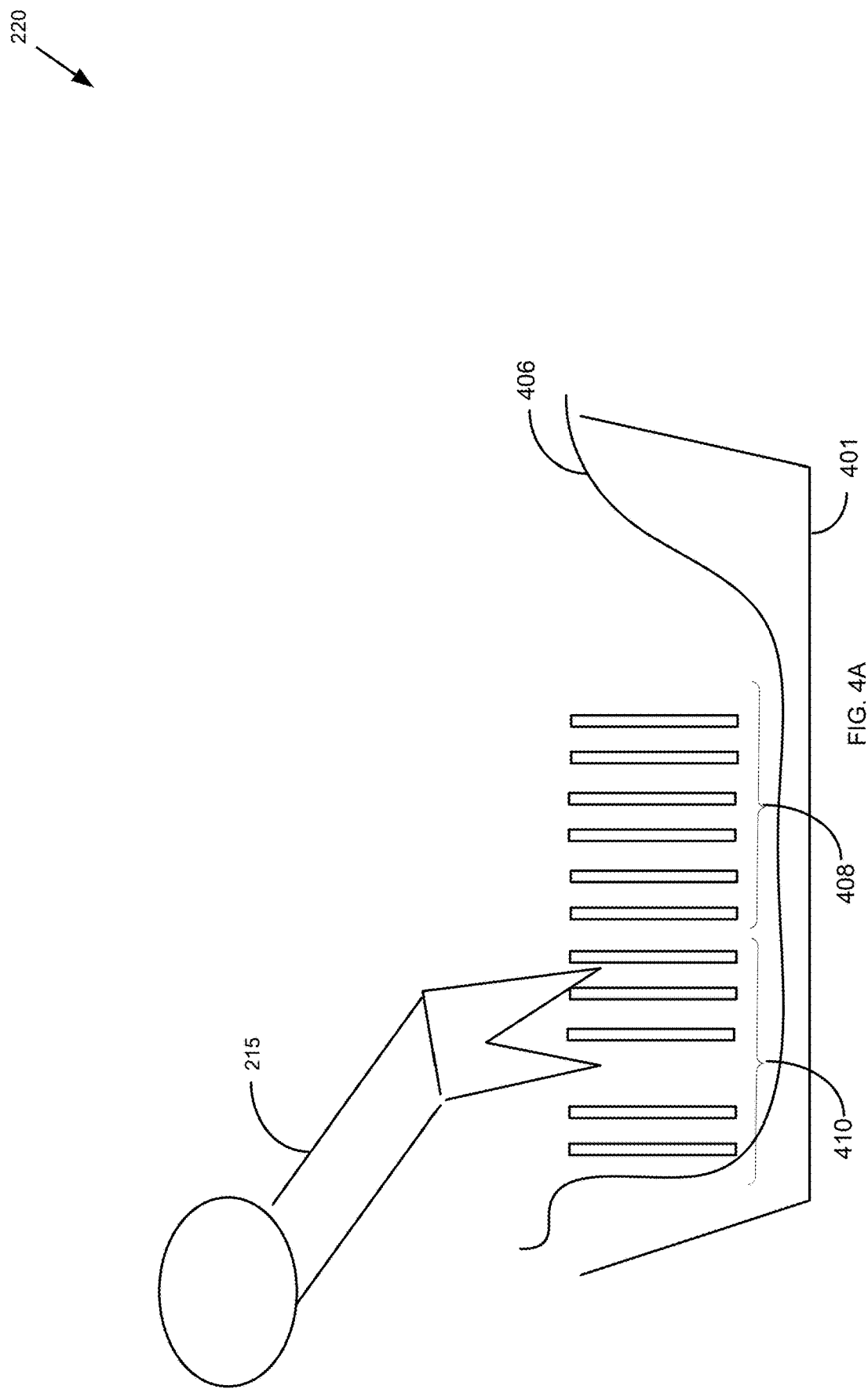

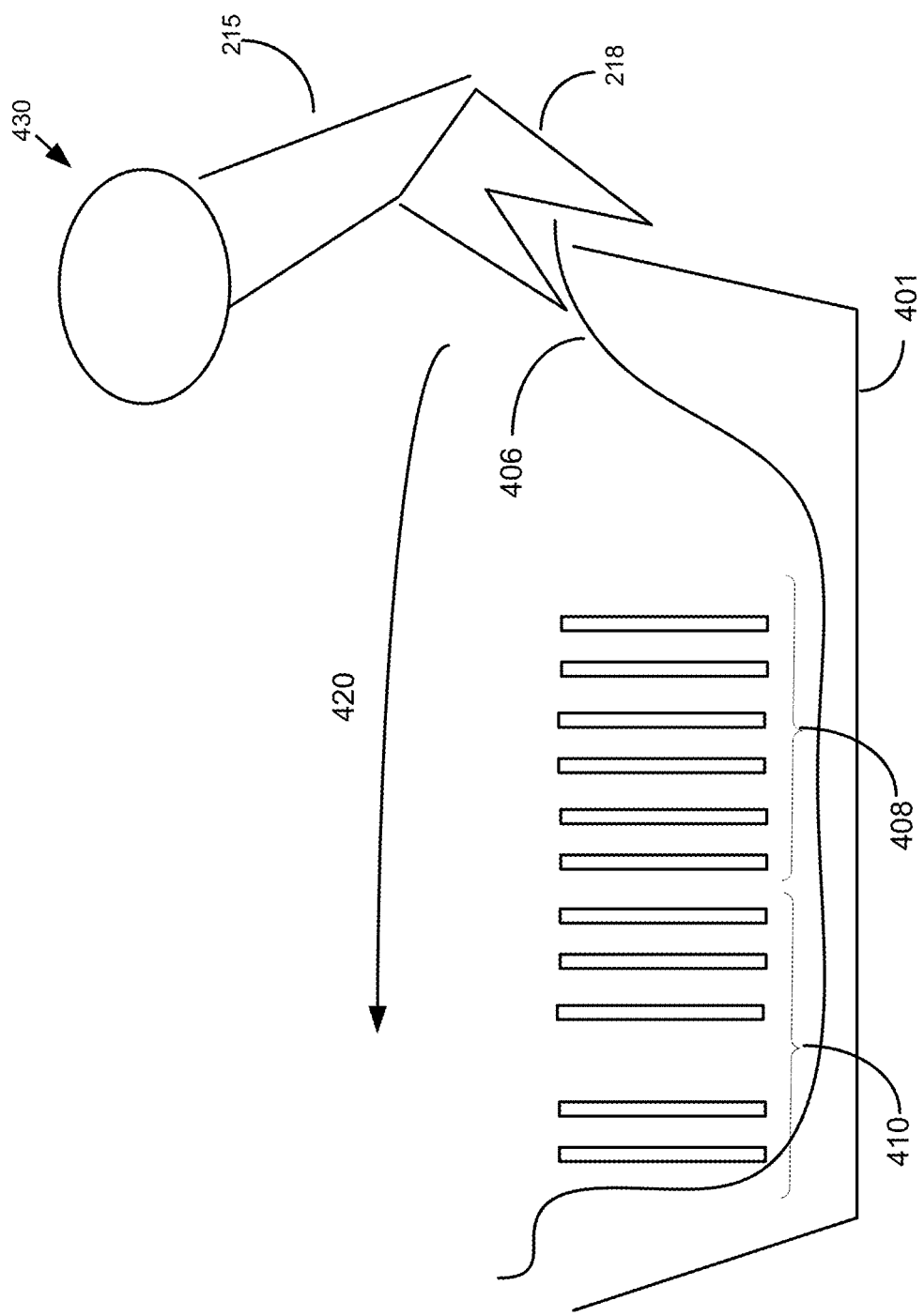

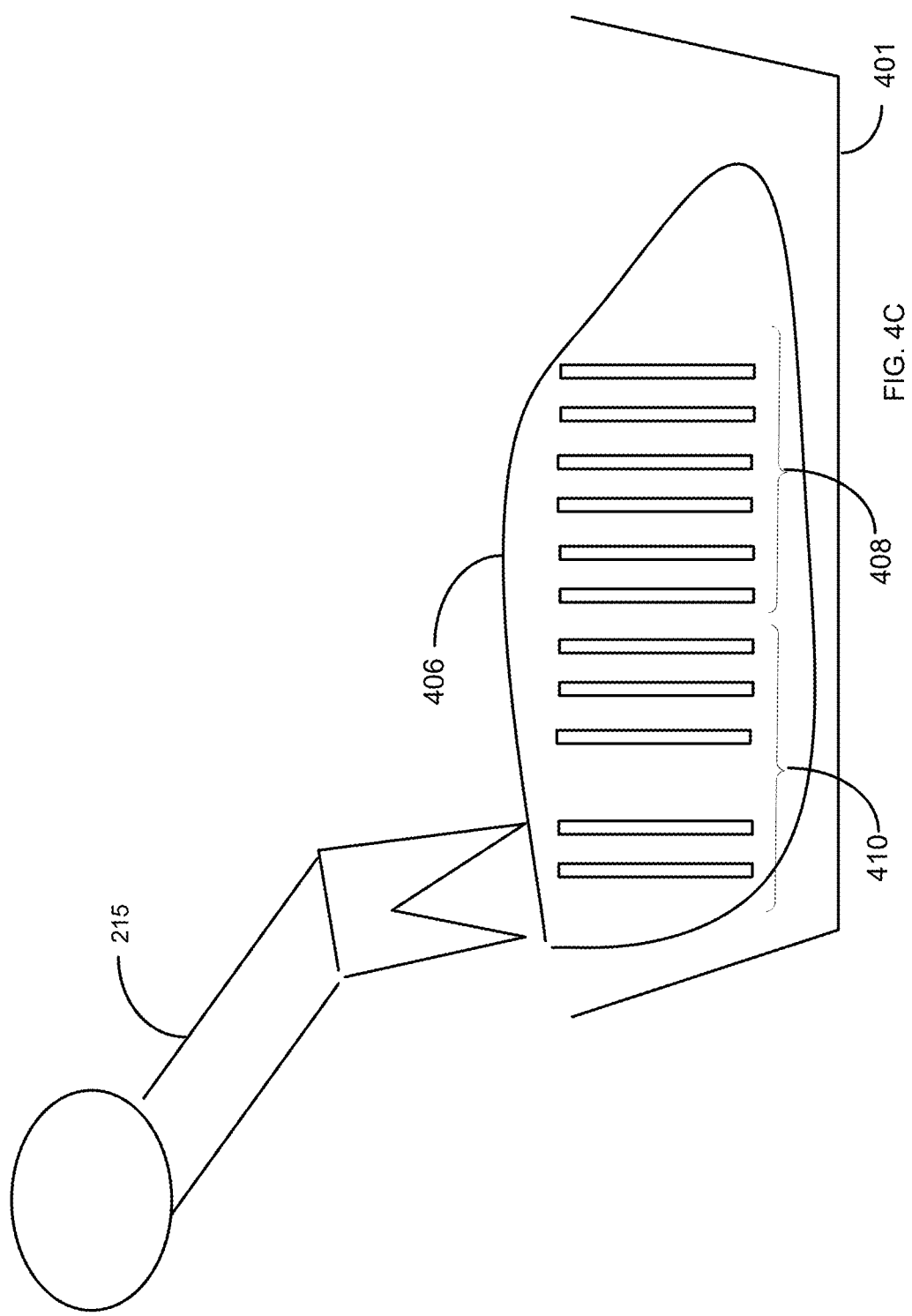

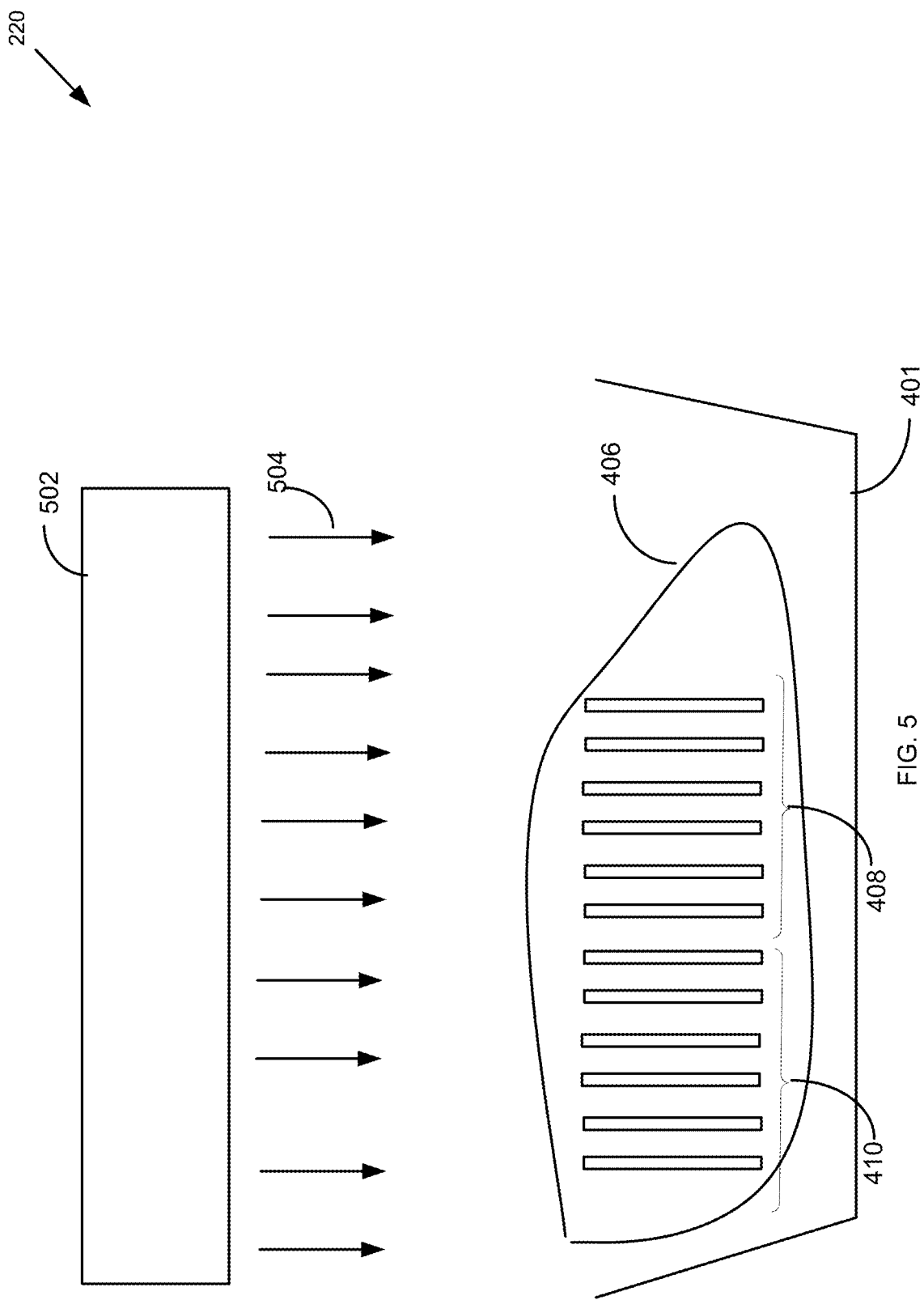

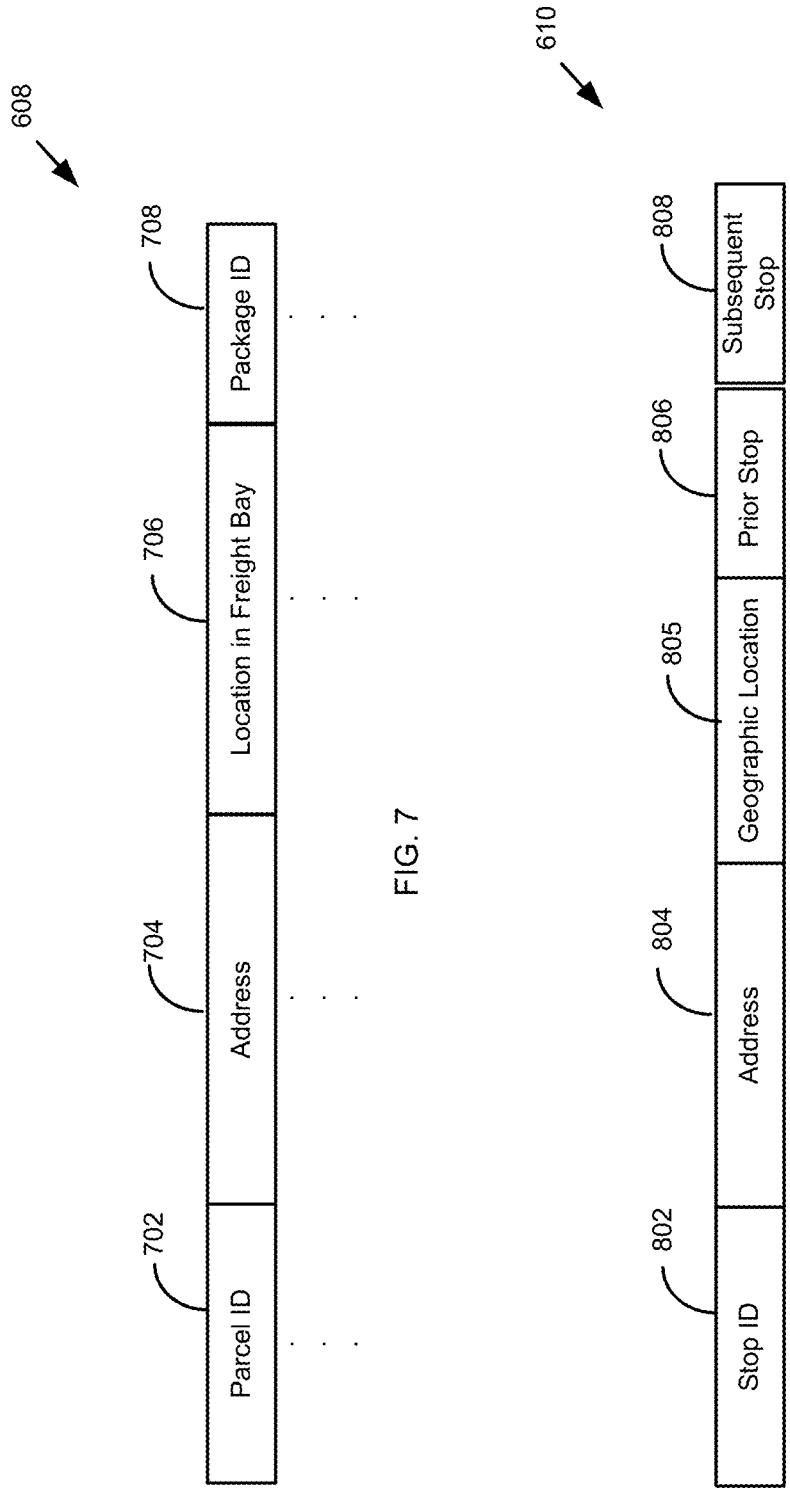

METHODS AND SYSTEMS FOR IN-ROUTE ITEM SORTING AND PACKAGING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 15/849,316, which, in turn, claims the benefit of priority to U.S. Provisional application Ser. No. 62/437,499, filed Dec. 21, 2016, the entire contents both of which are hereby incorporated by reference.

BACKGROUND

Field

Embodiments relate generally to automated sorting of distribution items based on a location of where the sorting is being performed.

Description of the Related Art

Current methods of item delivery are expensive, at least in part due to personnel costs. For example, delivery of an item is labor intensive. To perform a delivery, a human operator must drive a motorized vehicle along a delivery route. At each delivery location, the human operator may need to exit the vehicle and walk to a delivery point, such as a mail box or mail slot to deposit the mail. Additionally, the human operator may need to select a variety of items, including envelopes, items, packages, flats, and the like, for delivery to each address. For example, there may be one or more items that are individually addressed to a particular address. There may also be one or more items that are addressed to any customer on a particular route or within a particular geographic area. The human operator may need to select from the various types of items when assembling the set of items to be delivered to a particular address. Thus, the human operator's tasks include driving the delivery vehicle, assembling mail for a particular address, and physically delivering the items to a specific drop off location for each address along the delivery route. Thus, methods and systems to reduce the human operator's workload along a delivery route are needed to reduce the cost associated with item delivery.

SUMMARY

Methods and systems disclosed provide for automation of at least some of a human operator's tasks during an item delivery route. In particular, disclosed are methods and systems for assembling a package specific to a particular delivery address. The package may be comprised of items addressed to the specific delivery address, in addition to items that may be addressed to any item customer on a particular delivery route or within a particular geographic area. In some aspects, the disclosed methods and systems use automated means for assembling the delivery package. For example, the use of one or more robotic arms may be employed within the delivery vehicle itself, enabling the assembly of a delivery package while performing an item delivery route.

In one aspect described herein, a vehicle comprises a freight bay; a plurality of item storage bins disposed within the freight bay; a storage rack containing items to be delivered along a delivery route; a robot, disposed within the freight bay, the robot comprising an item manipulating attachment; and an electronic hardware processor, operably connected to the robot, wherein the processor is configured to: identify a location of the vehicle along the delivery route; identify a specific delivery point based on the location of the vehicle; identify a location of the items to be delivered to a specific delivery point along the delivery route; control the robot to retrieve the items to be delivered to the identified specific delivery point; and move the items to be delivered to the identified specific delivery point to one of the plurality of item storage bins.

In some embodiments, the freight bay comprises an opening, and the robot is configured to move the item from the item storage bin through the opening to a delivery location.

In some embodiments, the vehicle further comprises a cab and an access portal between the freight bay and the cab, and wherein the robot is configured to move the item from the item storage bin through the access portal to the delivery location, wherein the delivery location is within the cab.

In some embodiments, the electronic hardware processor is configured to cause the robot to retrieve the items intended for delivery to the specific delivery point and to cause the robot to deposit the items in a tray within the vehicle.

In some embodiments, the electronic hardware processor is configured to cause the robot to move the tray to the item storage bin.

In some embodiments, the vehicle further comprising a shrink wrap station disposed within the freight bay, wherein the electronic hardware processor is configured to cause the robot to move the tray to and from the shrink wrap station.

In some embodiments, the shrink wrap station comprises a heat source, and wherein the electronic hardware processor is further configured to energize the heat source after causing the robot to move the tray to the shrink wrap station.

In some embodiments, the hardware processor is configured to command the robot to position shrink wrap within the item bin so as to substantially enclose the items disposed in the tray.

In some embodiments, the robot comprises an optical scanner configured to read an intended delivery point on the items.

In some embodiments, the robot comprises a base portion, a hinge, and an arm, the base attached to the hinge and the arm attached to the hinge, the hinge providing for a variable position of the arm relative to the base.

In another aspect described herein, a method for delivering items comprises providing a vehicle having a plurality of item storage bins disposed within the freight bay and a storage rack containing items to be delivered along a delivery route; identifying, via a processor, a location of the vehicle along the delivery route; identifying, via the processor, a specific delivery point based on the location of the vehicle; identifying, via the processor, a location of the items to be delivered to a specific delivery point along the delivery route; retrieving, via a robot disposed within the vehicle, items to be delivered to the identified specific delivery point; and move the retrieved items to a delivery location.

In some embodiments, the delivery location is a location within the vehicle accessible by a carrier.

In some embodiments, the delivery location is a mailbox external to the vehicle.

In some embodiments, identifying the specific delivery point comprises identifying the next sequential delivery point along the delivery route to which items are intended for delivery.

In some embodiments, the method further comprises moving the items to be delivered to the specific delivery point to one of the plurality of item storage bins.

In some embodiments, the method further comprises shrink wrapping the identified items to be delivered to the specific delivery point prior to moving the items to the delivery location.

In some embodiments, the items are moved to the delivery location as the vehicle is moved to the next sequential delivery point.

BRIEF DESCRIPTION OF THE DRAWINGS

In the figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

FIG. 4A shows a cut away elevation view of exemplary item tray.

FIG. 4B shows the exemplary item tray of FIG. 4A after a robot has moved to a second position.

FIG. 4C shows exemplary items enclosed within shrink wrap.

FIG. 5 shows an elevation view of an exemplary item tray within a shrink wrap station.

FIG. 7 shows an exemplary database table within the item storage database.

FIG. 8 shows an exemplary structure for an item route database.

DETAILED DESCRIPTION

In the following description, numerous specific details are set forth to provide a thorough understanding of the present disclosure. One having ordinary skill in the art should recognize that the disclosure can be practiced without these specific details. In some instances, circuits, structures, and techniques have not been shown in detail to avoid obscuring the present disclosure. As used herein, the term item or distribution item can be a mailpiece, an envelope, a parcel, a package, a flat, magazine, catalog, residual mail, or any item capable of being delivered by a distribution network.

Figure 1:
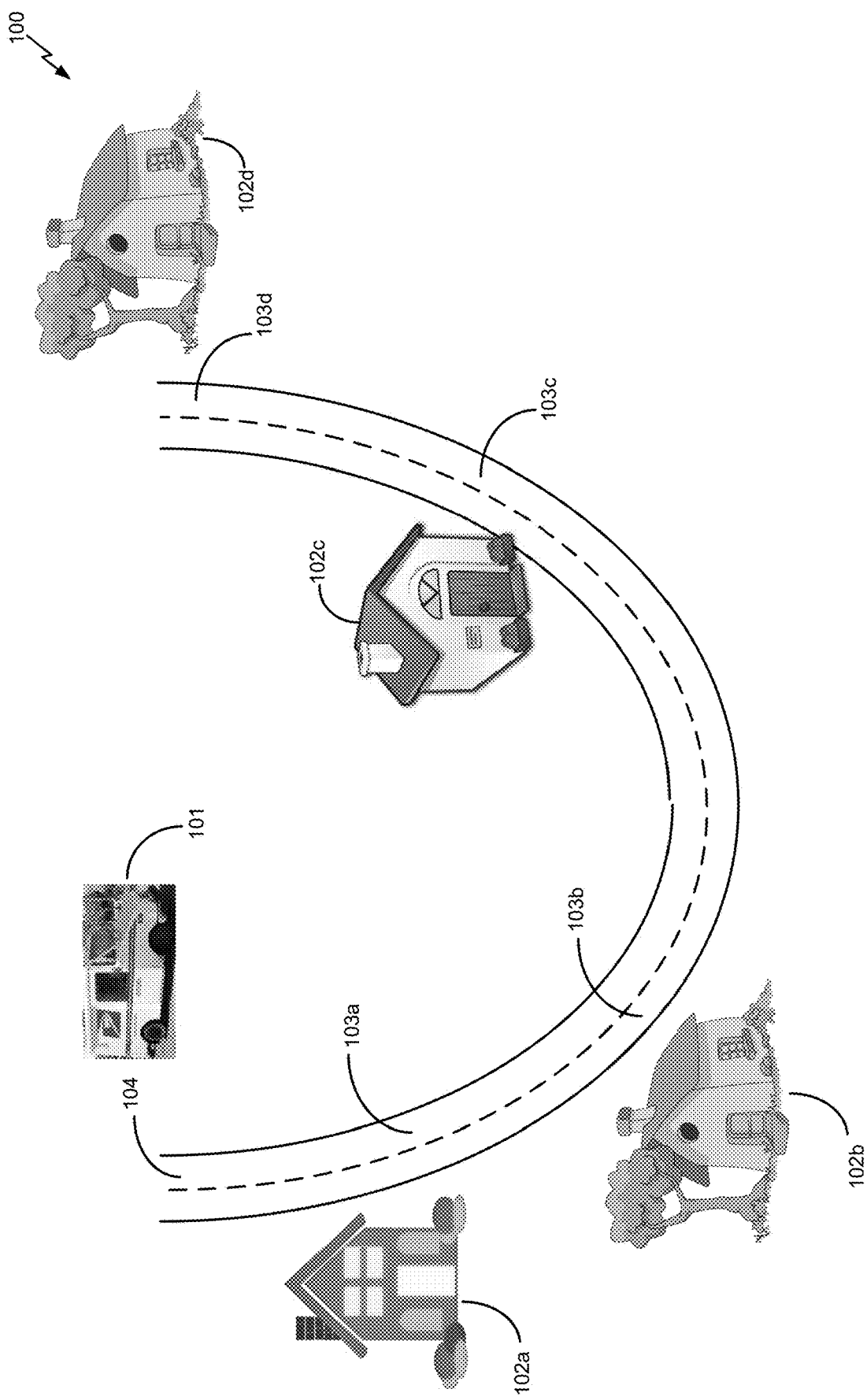
FIG. 1 is an overview diagram of an exemplary item delivery route.

FIG. 1 is an overview diagram 100 of an item delivery route. The item delivery route 104 includes a series of item delivery points 102a-d. The delivery points 102a-d are depicted as dwellings, but could be any location to which an item is to be delivered, such as, for example, a business, a P.O. Box, a receptacle, a vehicle, or any other destination. An item delivery vehicle 101 may stop at a number of item delivery stops 103a-d along the item delivery route 104, which can correspond to the one or more items to the delivery points 102a-d, in order to facilitate item delivery to the delivery points 102a-d.

To facilitate each delivery at the delivery points 102a-d using known methods, a human operator of the delivery vehicle 101, such as a carrier, may be required to exit the delivery vehicle 101 and walk to the delivery points 102a-d from a delivery stop 103a-d. Additionally, the human operator of the delivery vehicle 101 may also be required to sort through a variety of items, such as mail pieces, items, envelopes, and the like, located within the delivery vehicle 101 to identify one or more items that should be delivered to a particular delivery point 102a-d. In some embodiments, the items for delivery along the route 104 can be sorted according to the route 104, but may not be segregated according to items intended for delivery to each individual delivery point 102a-d. The human operator may need to take time to segregate only the delivery items for delivery to a particular delivery point 102a-d, or to a group of delivery points 102a-d. To improve efficiency and accuracy of the item delivery process, systems and methods described herein can be advantageously implemented.

Figure 2:
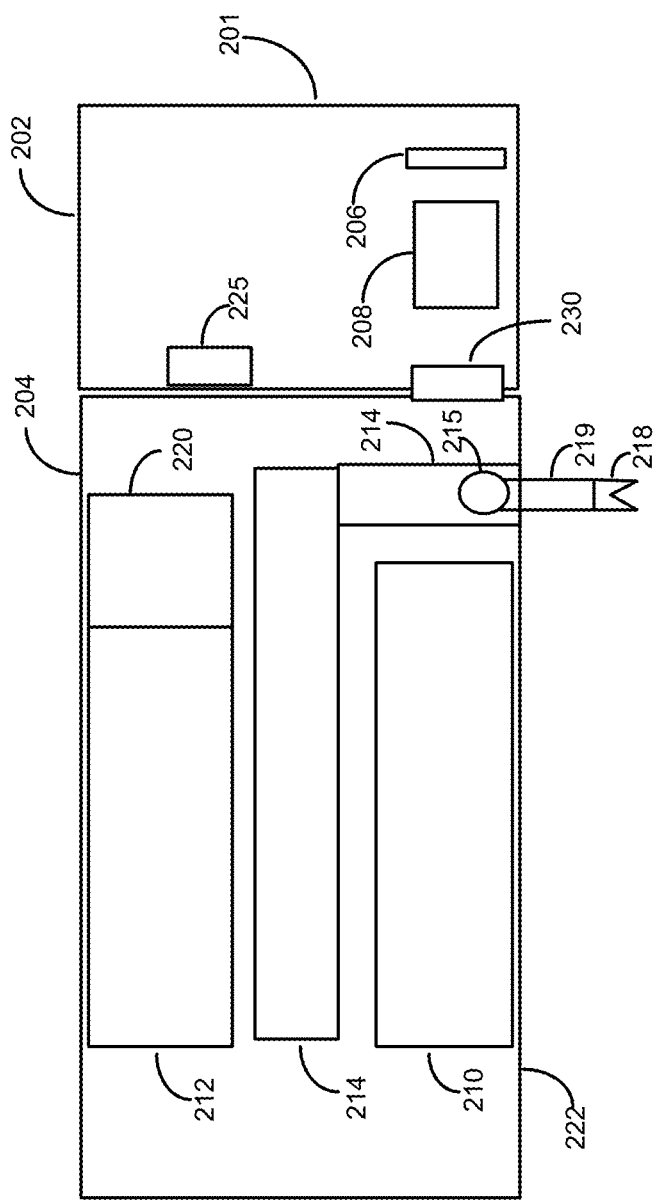
FIG. 2 is an internal top plan view of an exemplary delivery vehicle implementing one or more of the disclosed embodiments.

FIG. 2 is an top view of internal portions of an exemplary delivery vehicle 201 implementing one or more of the disclosed embodiments. FIG. 2 shows the delivery vehicle 201 includes a cab section 202 and freight bay section 204. The cab section 202 includes a steering wheel 206 and driver's seat 208. In some contemplated embodiments, the delivery vehicle may be autonomously controlled, and thus may not include the steering wheel 206 and/or driver's seat 208. In the exemplary delivery vehicle 201, the cab 202 also includes an item computer 225. The item computer 225 may electronically control one or more of the components discussed below with respect to FIG. 2 to accomplish item sorting according to one or more of the disclosed aspects.

In some aspects, the freight bay 204 includes two item racks 210 and 212. The freight bay may also include a robot trackway 214. The freight bay section 204 also includes a robot 215. The robot 215 includes an arm 219 and item manipulator 218.

The arm 219 can be an articulated arm with multiple joints and motors or servos to control the various movements of the arm 219, and can be similar to those used in the art. The item manipulator 218 can be a one or more pincher arms, fingers, grabbers, or the like. In some embodiments, the item manipulator 218 can be a vacuum-powered attachment, which uses a vacuum force to pick up items. The descriptions of the arm 219 and the item manipulator 218 are exemplary only, and a person of skill in the art will understand that other types of robotic arms and manipulators could be implemented without departing from the scope of the current disclosure.

In some aspects, the robot 215 is configured to move along the trackway 214. The robot may sort items stored in one or more of the item racks 210 and/or 212 in order to group items associated with a single delivery address together into an item package.

For example, the item racks 210 and 212 can line the interior walls of the delivery vehicle 201, and can include shelves, bins, or other storage devices. The item racks 210 and 212 may include designators or indicators to identify portions or segments of the shelves, and which can be marked by human and/or computer readable codes. The item racks 210 and 212 can store or hold items addressed to a variety of specific addresses, which may be sorted via barcode information or intelligent address code information. This sorting may have been performed prior to the items being loaded on to the delivery vehicle 201. During loading of the delivery vehicle 201, the loaded location of the items can be stored in the item computer 225. The item rack 210 or 212 may also separately include items addressed to any address within a particular geographic region or along a particular postal delivery route.

In some aspects, the robot 215 may be configured to group items associated with a specific delivery address with one or more items addressed to a general address, such as a geographic region or postal route that is appropriate to deliver to the specific delivery address. By grouping the items that are appropriate for delivery to the specific address, the robot 215 facilitates a human operator's task and reduces an amount of time required to delivery items to that address. This grouped set of items may be referred to as an "item package" throughout this disclosure.

In some aspects, the freight bay may also be equipped with a shrink wrap station 220. The shrink wrap station 220 may be configured with a heater that heats a heat-deformable polymer wrap, such as a shrink wrap, grouped set of items "item package".

In some aspects, the trackway 214 is disposed along a portion of the floor of a delivery vehicle 201, and includes features to mount and support a portion of the robot 215. The trackway 214 has a moveable connection to the robot 215, and is controlled by a computer or processor to allow the robot 215 to move along the trackway 214, thereby allowing the robot 215 to access the item racks 210 and 212, and also to extend to an area external to the delivery vehicle 201.

For example, as shown in FIG. 2, an arm 219 of the robot 215 is extended on the right side 222 of the delivery vehicle 201. The ability of the arm 219 of the robot 215 to extend to an area external to the delivery vehicle 201 may enable the robot 215 to deliver item packages directly to one or more delivery address drop locations associated with one or more corresponding delivery points 102a-d. For example, the robot 215 may deliver an item package directly to a delivery point 102a-d, such as, for example, a mailbox, without assistance from the human operator in some aspects.

FIG. 2 also shows an access portal 230 between the cab 202 and the freight bay 204. The access portal 230 can be an opening in a dividing wall between the cab 202 and the freight bay 204, and can allow the robot 215 to extend the item manipulator 218 into the cab 202 of the delivery vehicle 201 or allow the human operator to reach into the freight bay 204. This may allow the robot 215 to present items or item packages at a position convenient to a human delivery person.

Figure 3:
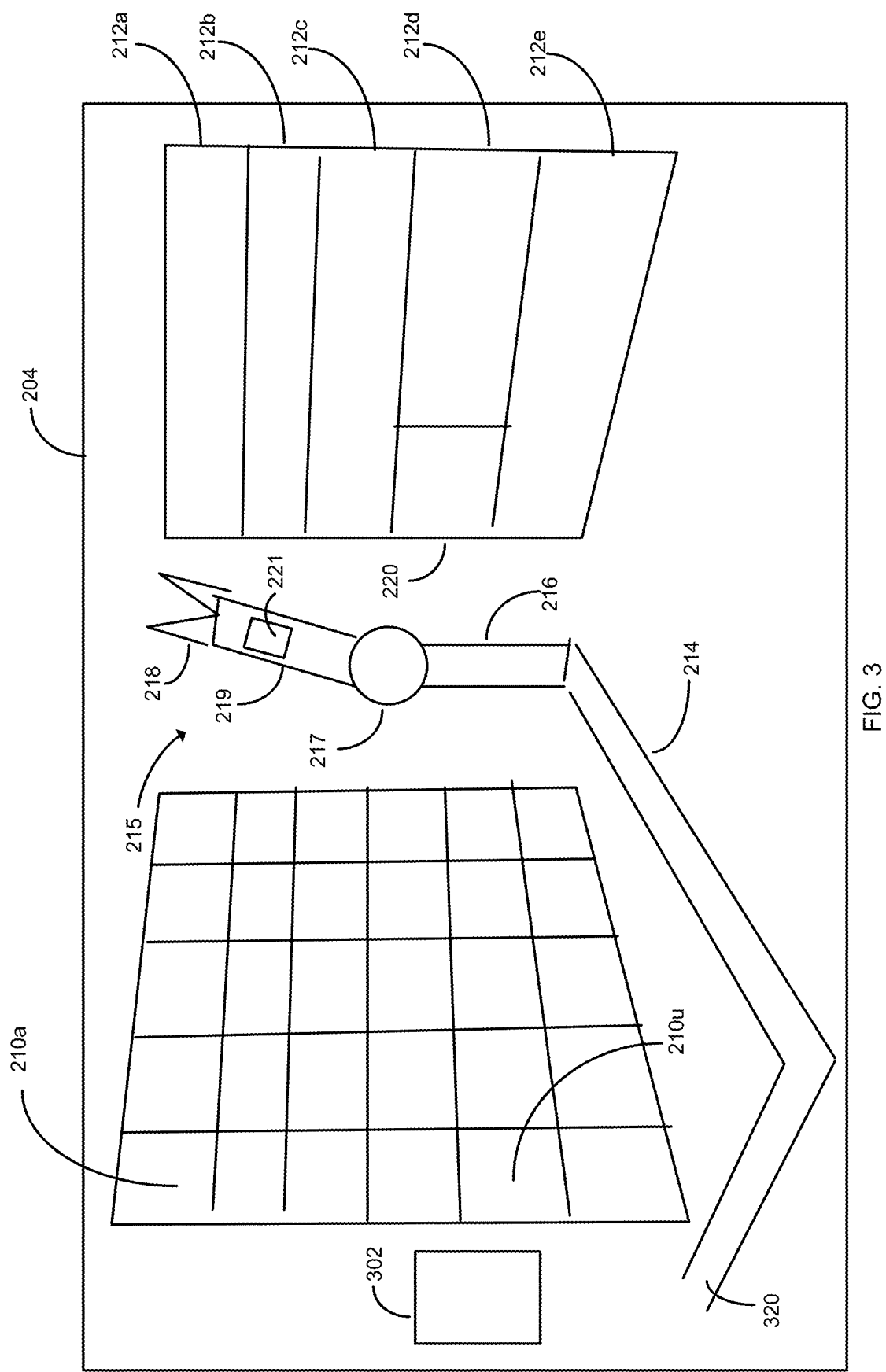
FIG. 3 shows a perspective view of an exemplary freight bay.

FIG. 3 shows another view of the freight bay 204. The freight bay 204 includes the item racks 210 and 212, as shown above with respect to FIG. 2. The item rack 210 is shown in FIG. 3 to be comprised of a plurality of individual storage locations or item storage bins, which are each designated for specific delivery addresses, shown as item storage bins 210a and 210u. Other item storage bins within the item rack 210 are unlabeled to preserve figure clarity. The individual item storage bins such as 210a and 210u may be used to store item packages after they have been assembled by the robot 215.

The item rack 212 can include a shelves 212a-212e on which parcels or items can be placed. In some embodiments, the shelves 212a-212e can be used to store large items that will not fit in the item storage bins 210a, 210u. In some embodiments, the shelves 212a-212e can be used to store items which have not yet been separated according to delivery point. After the items are separated according to delivery point, as will be described herein, the items can be placed in one of the item storage bins 210a, 210u.

The robot 215 includes a base portion 216, hinge portion 217, arm portion 219, and item manipulating attachment 218. The hinge portion is operably connected to the base portion 216 and the arm portion 219, and allows the arm portion 217 to move relative to the base portion 215. The base portion 216 is mounted to the trackway 214. The base portion 216 is configured to move within the trackway 214 so as to position the robot 215 within the freight bay 204. The robot arm 215 may be configured to remove an item package from one of the individual item storage bins, such as item storage bin 210a or 210u and position the item package such that the human operator may easily obtain them for delivery to an address. For example, the robot 215 may position the item package within the cab 202 shown in FIG. 2.

The robot 215 also includes a camera or scanner 221. The camera 221 can be an optical camera, a bar code reader, or imaging device configured to read labels on the item racks 210, 212, and to read delivery point information on the items. For example, the robot 215 may be used to segregate, separate, or sort items in the vehicle 201. The camera 221 is used to image the item to determine the delivery point of the items in order to facilitate segregation or sortation of items. The camera 221 is in communication with the item computer 225 and is configured to send images to the item computer 225 for decoding and/or processing.

In some embodiments, the robot arm 215 may provide an item package directly to an item delivery location associated with an address. For example, the robot arm 215 may retrieve an item package from one of the item storage bins 210a or 210u and move along the trackway 214 to position the item package outside the delivery vehicle 101 via an opening 302 in the freight bay 204. This may be accomplished in some aspects by positioning the base 216 of the robot 215 at positon 320 in the trackway 214, and extending the arm 219 through the opening 302. By positioning the item package at an appropriate location external to the delivery vehicle 101, via the opening 302, the robot 215 may deliver the item package directly to an item delivery location. In some other aspects, positioning the robot base 216 at position 320 in the trackway 214 may enable the arm 219 to extend through the access portal 230 discussed above with respect to FIG. 2.

FIG. 4A shows an exemplary item tray. The item tray 401 may be configured to fit within one or more of the item storage bins 210a or 210u shown in FIG. 3 and or within any space within the item racks 210 and/or 212. The item tray 401 is shown lined with shrink wrap 406. The robot 215 may be configured to position a first plurality of items 408 which are intended for delivery to a delivery point, and a second plurality of items 410 which are intended for delivery to a general address that are appropriate for delivery to the specific address 410, within the item tray 401.

For example, the first plurality of items 408 can include letters, flats, parcels, and the like which are addressed to a recipient at a specific delivery point, and which are sorted according to delivery point prior to being placed on the vehicle 201. The second plurality of items 410 can be items which are provided for delivery to all addresses along a route, and which are not specifically addressed to recipients at a delivery point, such as every day direct mail, bulk mailings, and the like. The robot 215 can collect the first plurality of items 408 from a first location within the vehicle 201, such as the item storage bin 210*a* or from shelf 212*a* and place it in the tray 401. The robot 215 can collect the second plurality of items 410 from a different location in the vehicle, 201, such as, for example, a place where unsorted bulk items are stored, and place the second plurality of items 210 in the tray 401 as well.

FIG. 4B shows the exemplary item tray 401 after the robot 215 has moved to a second position 430. From the second position 430, the robot arm 215 may be configured to grasp at least one portion of the shrink wrap 406 with the item manipulator 218. After grasping the portion of the shrink wrap 406, the robot 215 and/or the robot arm 219 may be configured to move in the direction indicated by the arrow 420, substantially enclosing the items 408 and 410 within the shrink wrap 406, as shown in FIG. 4C. FIG. 4C shows that items 408 and 410 have been enclosed within the shrink wrap 406 via the robot 215.

FIG. 5 shows the item tray 401 within the shrink wrap station 220. The item tray 401 may be positioned within the shrink wrap station 220 via the robot arm 215. The shrink wrap station 220 includes a heat source 502. After the item tray 401 is positioned within the shrink wrap station 220, the heat source 502 may energize to produce radiant heat 504 which will heat and deform the shrink wrap 406. Upon reaching a particular temperature, the shrink wrap 406 shrinks around the first and second plurality of items 408 and 410, forming a shrink-wrapped item package that is easily delivered to a delivery address by a human operator or by the robot 215. After the shrink wrap 406 has formed around the items 408 and 410, the robot 215 (not shown in FIG. 5) may move the item tray 401 to one of the item storage bins 210*a* or 210*u* for storage until the delivery vehicle 101 reaches a delivery address associated with the item package.

Figure 6:
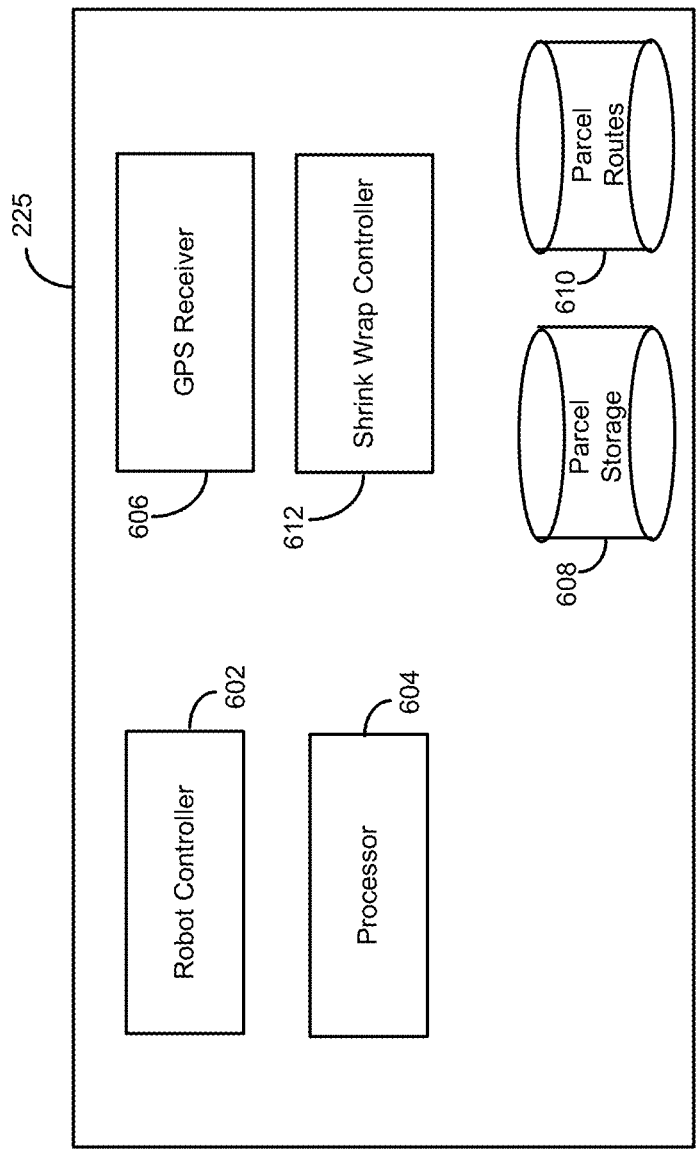
FIG. 6 shows a block diagram of an exemplary item sorting computer.

FIG. 6 shows an exemplary item computer. An item computer 625 can be similar to those described elsewhere herein. The item computer 625 is shown to include a robot controller 602, a processor 604, a global positioning system (GPS) receiver 606, an item location database 608, an item route database 610, and a shrink wrap controller 612. The robot controller 602 may be comprised of any type of electronic processor capable of controlling the robot 215 discussed above. The robot controller 602 may be operably connected to the robot 215 so as to execute commands to move the robot 215 along the trackway 214. The robot controller 602 may also be configured to move the robot arm 219 relative to the robot base 216 via the hinge 217, and to operate the item manipulator 218. The robot controller 602 may also be configured to move items within the freight bay 204 by grasping the items with the item manipulating attachment 218. For example, as discussed above, the robot controller 602 may be configured to move items addressed to a specific address to the item tray 401. The robot controller 602 may be configured to move items addressed to a general address appropriate for the specific address, via the robot 215, to the item tray 401. The robot controller 602 may also be configured to enclose the items within shrink wrap 406. The robot controller 602 may also be configured to move the item tray 401 into the shrink wrap station 220.

In some embodiments, the robot controller 602 is in communication with the camera 221, and can receive signals from the camera 221. The robot controller 602 can pass this information to the processor 604 for processing.

The processor 604 may be configured to control the shrink wrap station 220 in order to sort and/or shrink wrap items within the freight bay 204. The processor 604 may also be configured to control the various components in order to deliver one or more items, in some cases, with the items enclosed in shrink wrap, to a human operator or directly to a delivery address, for example, via the robot 215 and opening 302. The processor 604 may maintain location information for items within the freight may 204 in the item location database 608. One exemplary structure for the item location database 608 is shown in FIG. 7.

The shrink wrap controller 612 may be operably connected to the shrink wrap station 220. For example, the shrink wrap controller 612 may be configured to energize or de-energize the heat source 502. In some aspects, the shrink wrap controller 612 may receive temperature measurements from a temperature sensor included in the shrink wrap station 220 (not shown in FIG. 5), and control the heat source 502 based on the temperature measurements. For example, the shrink wrap controller 612 may control the heat source 502 to keep a temperature within the shrink wrap station within a temperature zone, so as to activate shrinking of shrink wrap, without exceeding safe temperatures.

FIG. 7 shows an exemplary database table within the item location database 608. Each row of the table may include an item identification number 702, an address to which the item is addressed 704, a location within the freight bay 706, and a package identification 708. The item identification 702 may be an intelligent mail barcode or an intelligent address code in some aspects. The address 704 may indicate whether the item is addressed to a specific address or to a general address, such as a postal route customer or a postal customer within a particular geographic region. The location 706 may identify where in the freight bay 204 the item is currently located. For example, the location 706 may identify whether the item is in the rack 210 or the rack 212. The location 706 may alternatively identify in which item storage bin, such as item storage bins 210*a* or 210*u* the item is currently located. The package identification 708 may indicate whether the item has been packaged for delivery. For example, the package identification 708 may indicate whether the item identified by the item ID 702 has been included with other items in an item package assembled by the robot 215. For example, a predetermined value may indicate the item is not included in a package. A range of other values may indicate the item is included in a package having the indicated value as an identifier.

In some aspects, empty tray locations may be identified via the item storage database. For example, in some aspects, an entry in the item location database 608 that has an item ID 702 set to a predetermined number (such as NULL or zero in some aspects) may include a location in freight bay 706 that stores an empty tray. Empty trays may be utilized to assemble item packages in some aspects.

Returning to FIG. 6, the processor 604 may further be configured to receive location information from the GPS receiver 606. The processor 604 may be further configured to receive item route information from the item route database 610. An exemplary structure for the item route database 610 is shown in FIG. 8 below.

FIG. 8 shows an exemplary structure for an item route database. A row for the exemplary item route database 610 includes a stop identification field 802, an address of the stop 804, a geographic location of the stop 805, a prior stop 806, and a subsequent stop 808. The stop ID field 802 uniquely identifies a particular stop. The address field 804 provides a postal address for the stop. The geographic location 805 identifies a geographic location of the stop. The geographic location 805 may be in the form of GPS coordinates in some aspects. The prior stop 806 and subsequent stop 808 fields identify stop identification fields 802 of stops prior to and subsequent to the stop respectively, thus, effectively ordering the stops within the item route database 810 and providing a doubly linked list to make traversal of the route in either direction from any one particular stop relatively easy.

Returning to FIG. 6, based on the item route database 610 and the item location database 608, the processor 604 may sort and/or package items to prepare them for delivery. For example, the processor 604 may be configured to sort and/or package items for delivery to a specific delivery address before the delivery vehicle 101 arrives at the specific delivery address.

Figure 9:
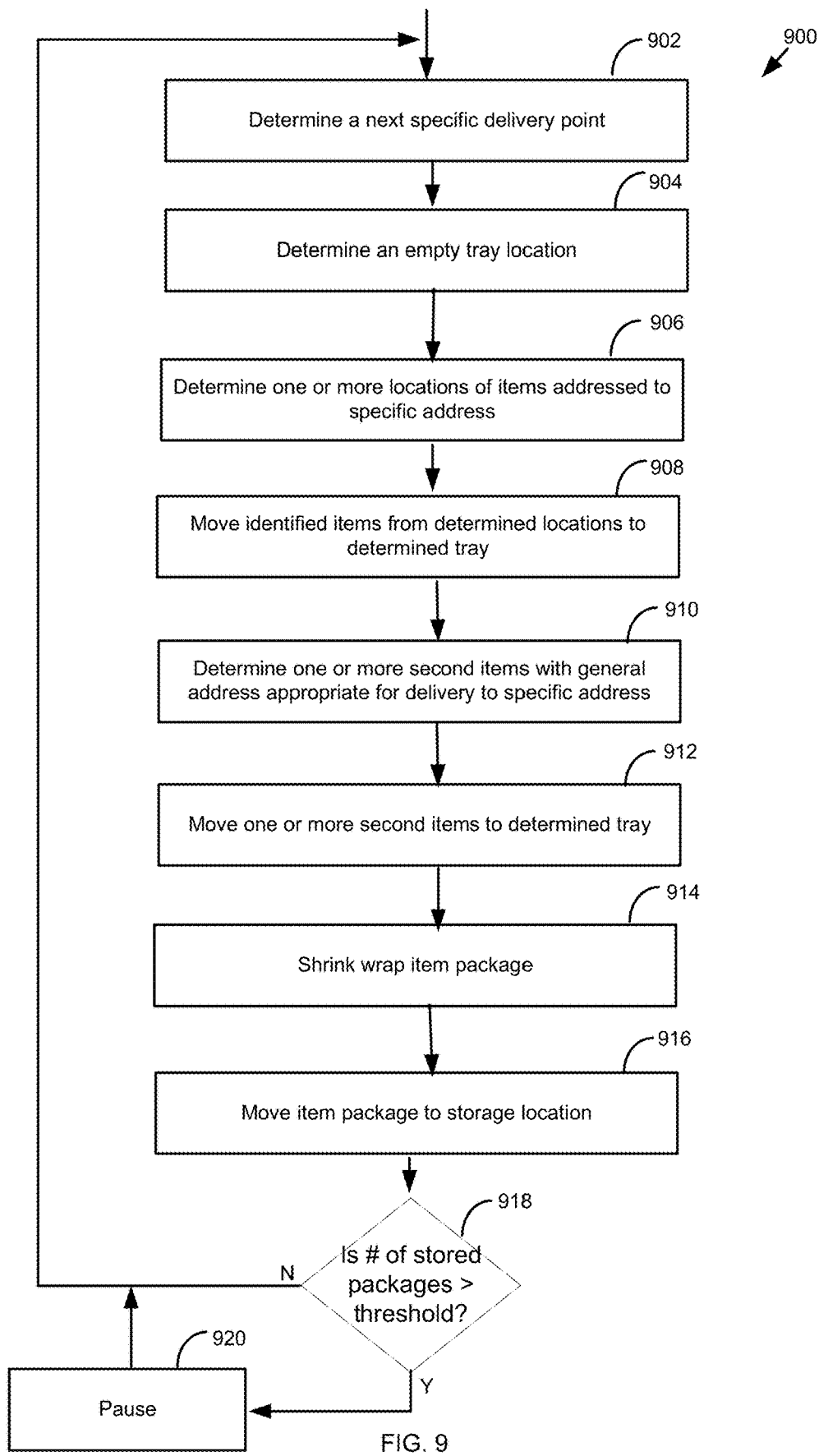
FIG. 9 is a flowchart of an exemplary method for preparing item packages for delivery to a specific delivery point.

FIG. 9 is a flowchart of a method for preparing item packages for delivery to a specific address. In some aspects, the process 900 may be performed by the processor 604.

The process 900 begins in block 902, a specific address or delivery point for delivery is identified. In some aspects, the determination of the specific delivery point is based on GPS data received from the GPS receiver 606. In some aspects, the determination is based on item route data received from the item route database 610.

The specific delivery point can be determined via the GPS receiver 606 as the next delivery point along the delivery route, or it can be a collection of upcoming delivery points along the route.

In block 904, an empty tray location is identified. For example, in some aspects, block 904 may search the item location database for an entry that has an item ID field 702 equal to a predetermined number, such as zero or NULL, as discussed above. Such entries may identify an empty tray location in the freight bay 204 via the location field 706.

In block 906, locations of items intended for delivery to the specific delivery point determined in block 902 are determined. In some aspects, block 906 may search the item location database 608 for entries having a specific address field 704 matching the location determined in block 902. The locations of these items will be determined based on the entry's location in freight bay field 706.

In some embodiments, the location of items intended for delivery to the specific delivery point can be identified using an the camera or scanner on the robot 215. For example, the items for delivery can be arranged sequentially according to delivery point within the vehicle. The robot 215, using the camera 221 can image the items and the item computer 225 can determine how many of the items are intended for delivery to the specific delivery point. For example, as the robot 215 examines the items for deliver, the camera 221 can identify the intended delivery points for the items and retrieve only the items intended for delivery to the specific delivery point. In some embodiments, the camera 221 can identify when the intended delivery points on the items change from the specific delivery point to another delivery point, and, accordingly, retrieve all the items before the detected change in delivery point.

In block 908, the one or more items are moved from the locations determined in block 906 to the tray determined in block 904. In some aspects, block 908 may be accomplished by commanding the robot 215 to move the items to the tray. For example, the processor 604 may send instructions to the robot controller 602 to accomplish the movement of the items. In some aspects, this may include instructing the robot to pick up items from their locations and then instructing the robot 215 via the robot controller 602 to deposit the items in the empty tray.

In block 910, one or more second items with general addresses appropriate for delivery to a specific address are determined. In some aspects, block 906 may include searching the item location database 608 for entries having an address field 704 including a general address and not a specific address. A determination may then be made as to whether an item with the identified general address is appropriate for delivery to the specific address identified in block 902.

In block 912, the one or more second items are moved to the tray determined in block 904. In some aspects, block 912 including instructing the robot 215 via the robot controller 602, to retrieve the second items from their locations as indicated by the location field 706 of the item location database 608, and further instructing the robot to move the retrieved items to the tray location of block 904. After block 912 completes, an item package may exist in the tray.

In block 914, the item package formed by the completion of block 912 is shrink wrapped In some aspects, block 914 includes instructing the robot 215 to move the tray to the shrink wrap station 220. The heat source 502 may then be energized to cause the shrink wrap 406 to enclose the item package. For example, in some aspects, the processor 604 may instruct the shrink wrap controller 612 to heat the shrink wrap station 220 after the item package is moved to the shrink wrap station.

In block 916, the item package is moved to a storage location. For example, block 916 may include instructing the robot 215, via the robot controller 602, to retrieve the item package from the shrink wrap station 220, and further include instructing the robot 215 to move the item package to an available item storage bin, such as item storage bins 210a or 210u, shown above with respect to FIG. 2.

In block 918, the number of stored item packages is compared to a threshold. If the number of stored item packages is above a threshold, sorting and packaging of items via process 900 may pause. The pause may reduce the need for item storage bins to store item packages before delivery. If the number of stored packages is not above the threshold, process 900 may repeat for a next specific address at block 902.

In some embodiments, the process 900 occurs at intervals throughout the route. In some embodiments, the process 900 occurs for the next delivery point along the route. The process 900 can advantageously occur while the human operator is driving the vehicle to the next delivery point, or while the human operator exits the vehicle 101 to place the items to be delivered in a mailbox, on a porch, or in another similar location.

Process 900 is described with reference to step 914, where the items for delivery to a specific delivery point. This is exemplary only. The process 900 can proceed without a shrink wrapping step, and the items intended for delivery to the specific delivery point can be retrieved and placed in an item storage bin without being shrink wrapped. A person of skill in the art will understand how to implement process 900, and any other embodiment or process described herein without shrink wrapping the items.

Figure 10:
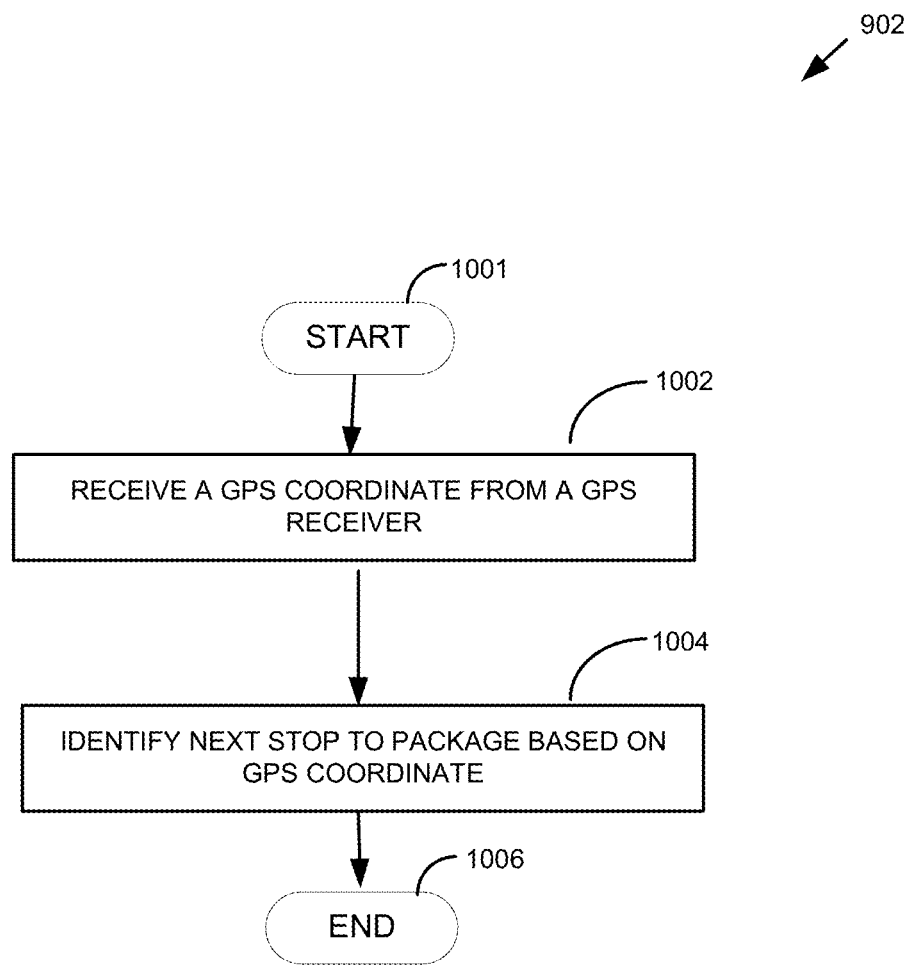
FIG. 10 is a flowchart of one exemplary method of determining a next specific address to package.

FIG. 10 is a flowchart of an exemplary method of determining a specific address for which items will be packaged. In some aspects, the process 902 may be performed as part of the process 900 of FIG. 9. In some aspects, the process 902 may be performed by the processor 604 discussed above with respect to FIG. 6.

In block 1002, GPS coordinates are received from a GPS receiver. For example, in some aspects, the processor 604 may receive GPS coordinates for the delivery vehicle 101 from the GPS receiver 606.

In block 1004, a next stop to package is determined based on the GPS coordinate. To perform block 1004, in some aspects, the processor 604 may identify a first stop in the item route database 610 closest to the GPS coordinate. Based on the address field 804 of the first stop, the processor 604 may then search the item location database 608 to identify items appropriate for the address identified in the address field 804. This may include items with address fields 704 matching the address field 804, or address fields 704 including a general address appropriate for delivery to the address specified by the address field 804 for the first stop. The processor 604 may then identify if any of the identified items have a package identification 708 indicating the item has not been packaged. If so, the first stop is the next stop to be packaged. Otherwise, a second step that is second closest to the GPS coordinate may be identified, and the item location database 608 searched to identify unpackaged items for the second stop. This process may repeat until a stop with unpackaged items is identified.

Figure 11:
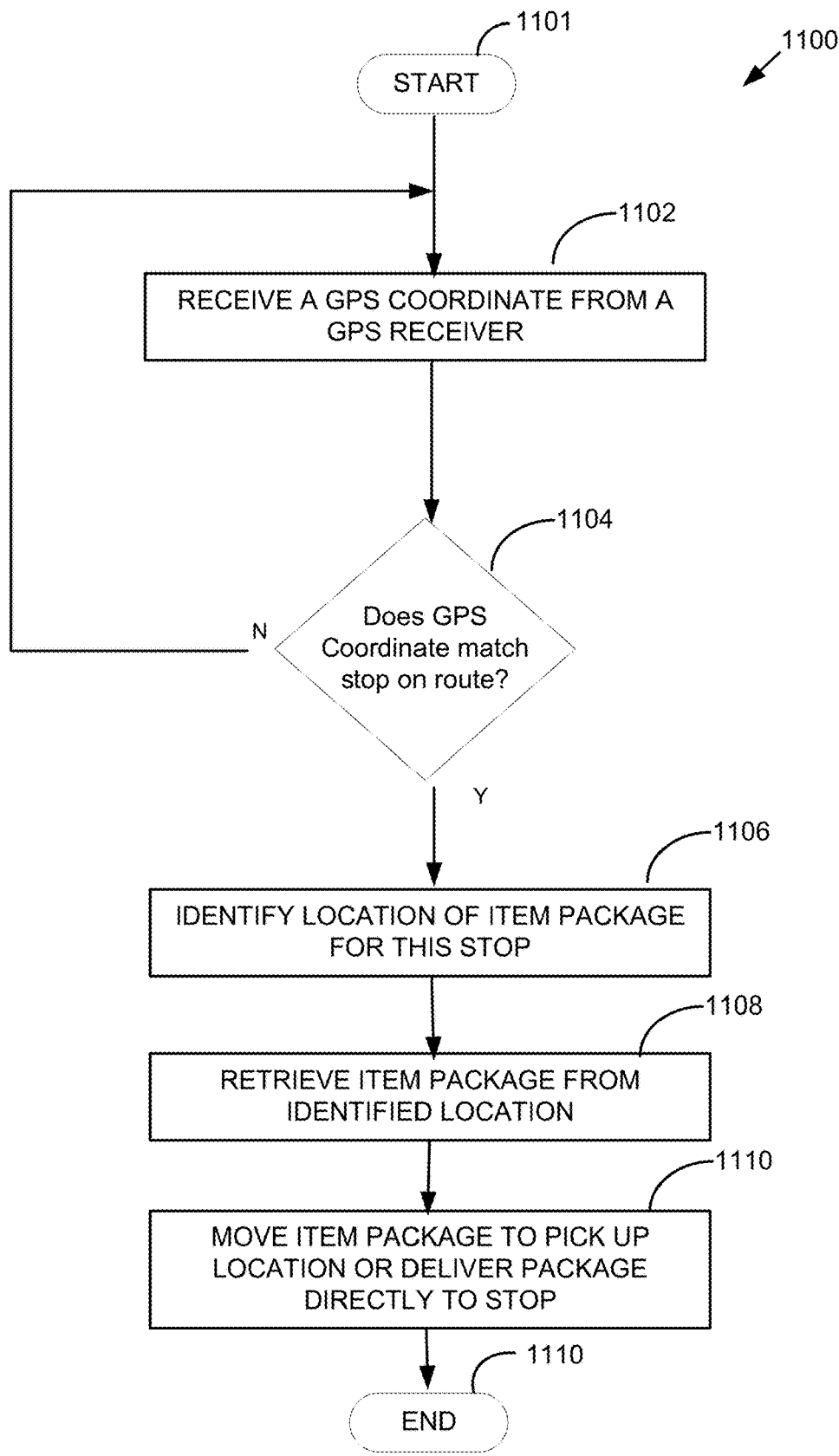
FIG. 11 is a flowchart of an exemplary method of retrieving an item package for a stop.

FIG. 11 is a flowchart of an exemplary method of retrieving an item package for a stop. In some aspects, the process 1100 described below with respect to FIG. 11 may be performed by the processor 604. For example, instructions included in an electronic hardware memory of the item computer 225 may configure the processor 604 to perform one or more of the functions discussed below.

In block 1102 a coordinate is received from a GPS receiver. In some aspects, the processor 604 may receive the GPS coordinate from the GPS receiver 602. The GPS coordinate may indicate a location of the delivery vehicle 101.

Decision state 1104 determines whether the coordinate matches a stop along a postal route. Decision state 1104 may be accomplished by searching the postal route database 610 for a geographic location 805 within a threshold distance of the GPS coordinate. The threshold distance may be one (1) foot, one (1) meter, two (2) meters, three (3) meters, four (4) meters, five (5) meters, or any distance. If a match is not found, process 1100 returns to block 1102.

If the GPS coordinate does match with a stop on the route, process 1100 moves to block 1106, which identifies a location of items within the vehicle for delivery at the identified stop. In some aspects, block 1106 determines which item storage bin within the delivery vehicle 101 holds an item package for the identified stop. In some aspects, the item package may have been previously assembled by process 900, discussed above with respect to FIG. 9. In some aspects, process 900 may have stored the location of the item package in the item database 608. For example, each item in the item database 608 may indicate the (same) location of the package including the item. Thus, block 1106 may search the item database 608 for items having an address field corresponding to the address of the stop. Under conditions where process 900 is packaging items before arrival at a stop location, any items for the stop should be packaged and waiting in a location within an item storage bin, such as one of item storage bins 210*a* or 210*u* discussed above with respect to FIG. 2.

In block 1108, the item package for the stop is retrieved from the location identified in block 1106. In some aspects, block 1108 includes commanding the robot 215 to grasp the item package in the identified location with the item manipulating attachment 218. In some aspects, this may be accomplished by the processor 604 sending an appropriate command to the robot controller 602. The command may be comprised of at least two steps, such as move to a position on the trackway 214 corresponding to the item package's location. Extend the arm 219 to a position that allows the item manipulating attachment to grasp the package at its identified location, and command the item manipulating attachment to close around the package.

In block 1110, the item package is moved to either a pick up location or the item package is delivered directly to the stop. For example, in some aspects, the item may be moved to a position that allows a human operator of the delivery vehicle 101 to obtain the item package for human delivery. For example, this position may be, in some aspects, a position within the cab 202 of the delivery vehicle 101. Thus, in these aspects, the processor 604 may send a command to the robot controller 602 to move the robot 215 to a position 320 that provides for access to the cab 202. The processor 604 may then command the robot controller 602 to move the robot arm 219 through the access portal 230 and present the item package for human delivery.

In some aspects, the item may be moved to a position that allows a delivery of the item to the delivery point to be completed. For example, in some aspects, block 1110 may include commanding the robot 215 to move the item package into an item drop box, such as a mailbox, by extending the item package to a position external to the delivery vehicle 101. For example, in some aspects, the arm 219 of the robot 215 may be moved through the window 302 to affect a delivery to an item drop box. Upon placing the item package in the drop box, the item manipulating attachment 218 may release the item package. The robot arm 219 may then withdraw back through the opening 302 into the freight bay 204. The delivery vehicle 101 may then move to a next stop.

In some embodiments, the robot 215 moves the item package to a location within the vehicle accessible by a carrier, wherein the carrier retrieves the item package and delivers the items to the delivery point.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art.

The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described.

A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items.

The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. An item delivery system comprising:
   a vehicle having a freight bay, the freight bay containing items to be delivered along a delivery route;
   a robot, disposed within the freight bay, the robot comprising an item manipulating attachment; and
   an electronic hardware processor, in communication with the robot, wherein the processor is configured to:
   identify a location of the vehicle along the delivery route;
   identify a delivery point based on the location of the vehicle;
   identify a location within the freight bay of the items to be delivered to the delivery point; and
   control the robot to retrieve the items to be delivered to the identified delivery point from the location; and
   control the robot to place the items in an operator accessible area within a cab portion of the vehicle.

2. The system of claim 1, wherein the processor is further configured to control the robot to provide the items to be delivered to a location within the vehicle.

3. The system of claim 1, wherein the processor is further configured to control the robot to provide the items to be delivered to a location external to the vehicle.

4. The system of claim 1, wherein the robot comprises an optical scanner configured to read an intended delivery point on the items.

5. The system of claim 1, wherein the robot comprises a base portion, a hinge, and an arm, the base portion attached to the hinge and the arm attached to the hinge, the hinge providing for a variable position of the arm relative to the base.

6. The system of claim 1, wherein the items to be delivered to the delivery point include a first type of items and a second type of items, wherein the first type of items are at a first location within the freight bay, and wherein the second type of items are at a second location within the freight bay.

7. The system of claim 6, wherein the processor is further configured to control the robot to retrieve the first type of items from the first location and to retrieve the second type of items from the second location, and to provide both the first type of items and the second type of items to a location within the vehicle.

8. The system of claim 6, wherein the first type of items are addressed specifically to the delivery point, and wherein the second type of items are addressed to a general address.

9. A method for delivering items, comprising:
- identifying, via a processor, a location of a vehicle along a delivery route;
- identifying, via a processor, a delivery point based on the identified location of the vehicle;
- identifying, via a processor, a location within the vehicle of one or more items to be delivered to the delivery point; and
- retrieving from the location within the vehicle, via a robot disposed within the vehicle and comprising an item manipulating attachment, the one or more items to be delivered to the delivery point; and
- moving, via the robot, the one or more items to an operator accessible area located within a cab portion of the vehicle.

10. The method of claim 9, further comprising providing the retrieved one or more items to a location within the vehicle.

11. The method of claim 9, further comprising provide the retrieved one or more items to a location external to the vehicle.

12. The method of claim 9, wherein the one or more items to be delivered to the delivery point include a first type of items and a second type of items, wherein the first type of items are at a first location within the freight bay, and wherein the second type of items are at a second location within the freight bay.

13. The method of claim 12, wherein further comprising:
- retrieving the first type of items from the first location;
- retrieving the second type of items from the second location; and
- providing both the first type of items and the second type of items to a location within the vehicle.

14. The method of claim 13, wherein the first type of items are addressed specifically to the delivery point, and wherein the second type of items are addressed to a general address.

15. The method of claim 9, wherein retrieving the one or more items comprises:
- reading, via an optical scanner, an intended delivery point on the one or more items to identify items having the intended delivery point corresponding to the identified delivery point; and
- retrieving from the one or more items, items having the intended delivery point corresponding to the identified delivery point.

16. The method of claim 9, further comprising:
- identifying, via a processor, a next delivery point based on the identified delivery point;
- identifying, via a processor, a location within the vehicle of one or more items to be delivered to the next delivery point; and
- retrieving, via the robot, the one or more items to be delivered to the next delivery point.

17. An item delivery system comprising:
- a vehicle having a freight bay, the freight bay containing items to be delivered along a delivery route, wherein the items to be delivered to the delivery point include a first type of items and a second type of items and wherein the first type of items are addressed specifically to the delivery point, and wherein the second type of items are addressed to a general address;
- a robot, disposed within the freight bay, the robot comprising an item manipulating attachment; and
- an electronic hardware processor, in communication with the robot, wherein the processor is configured to:
  - identify a location of the vehicle along the delivery route;
  - identify a delivery point based on the location of the vehicle;
  - identify a first location within the freight bay of a first type of items to be delivered to the delivery point and a second location within the freight bay of a second type of items to be delivered to the delivery point; and
  - control the robot to retrieve the items to be delivered to the identified delivery point from the location.

* * * * *